United States Patent [19]

Bingaman

[11] 4,432,506

[45] Feb. 21, 1984

[54] REEL AND HUB LOCK FOR TAPE DRIVES

[75] Inventor: Barrett P. Bingaman, Burbank, Calif.

[73] Assignee: Cetec Corporation, El Monte, Calif.

[21] Appl. No.: 402,773

[22] Filed: Jul. 28, 1982

[51] Int. Cl.³ .................... B23B 31/14; B65H 17/02
[52] U.S. Cl. .................................. 242/68.3; 279/2 R
[58] Field of Search ................ 242/68.1, 68.2, 68.3, 242/129.5; 279/2 R

[56] References Cited

U.S. PATENT DOCUMENTS

| | | | |
|---|---|---|---|
| 3,035,788 | 5/1962 | Horberg | 242/68.3 |
| 3,272,451 | 9/1966 | Pendleton | 242/68.3 |
| 3,375,995 | 4/1968 | Roman | 242/68.3 |
| 3,490,716 | 1/1970 | Miller, Jr. et al. | 242/68.3 |
| 3,544,027 | 12/1970 | Green et al. | 242/68.3 |
| 3,850,382 | 11/1974 | Clingerman et al. | 242/68.3 |
| 3,946,962 | 3/1976 | Deletzke, Jr. | 242/68.3 |

Primary Examiner—Stuart S. Levy
Assistant Examiner—Lloyd D. Doigan
Attorney, Agent, or Firm—Harris, Kern, Wallen & Tinsley

[57] ABSTRACT

A mechanism for centering and locking a tape reel or a tape hub on a drive shaft in a tape drive. A mechanism which can be actuated manually to lock a reel or hub in place and to unlock the reel or hub and also which will automatically lock the reel or hub in place by centrifugal force. A housing with radial passages for balls, with the housing and a subplate mounted on a drive shaft, and a plunger in the housing spring loaded to a nonlocking position and manually movable to a locking position, with a latching mechanism for holding the plunger in the locking position.

4 Claims, 3 Drawing Figures

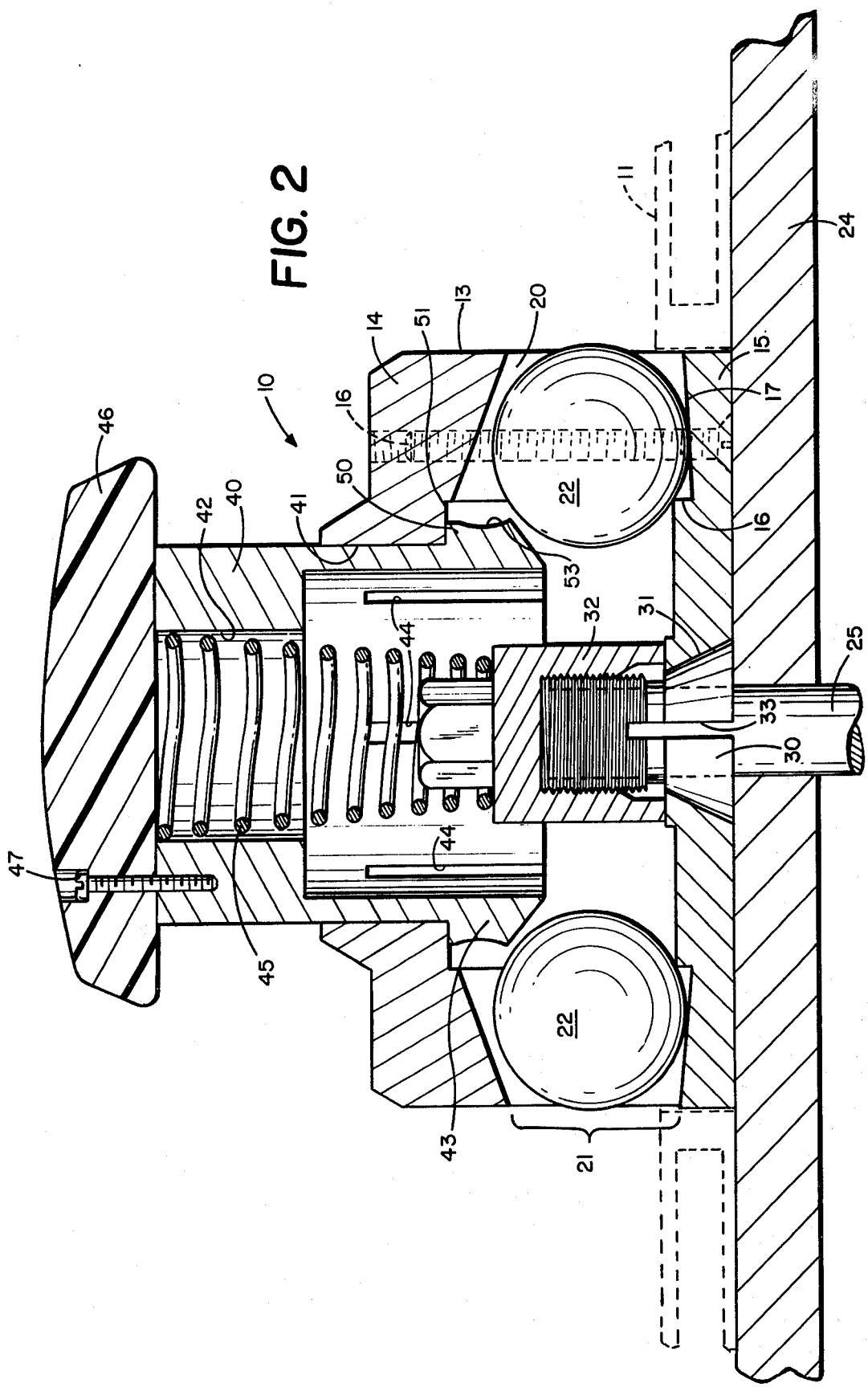

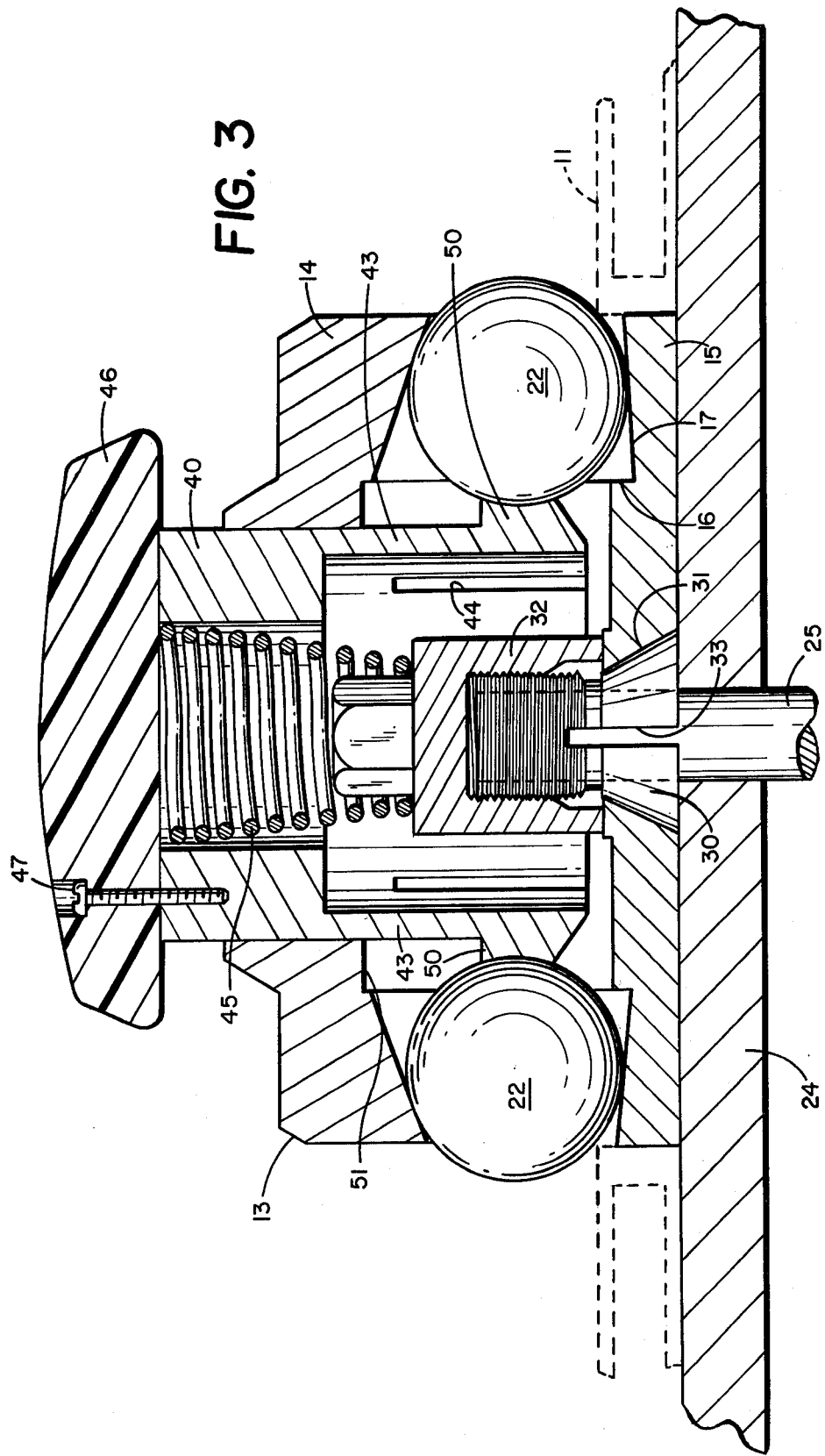

4,432,506

REEL AND HUB LOCK FOR TAPE DRIVES

BACKGROUND OF THE INVENTION

This invention relates to tape drives and the like, and in particular to a new and improved mechanism for centering a reel or hub on a drive shaft and locking the reel or hub in place.

In the past, various manually operated locking mechanisms have been utilized with tape drives. Another conventional form of mechanism has utilized centrifugal force of the rotating system for locking the reel or hub in position. Each of the prior art devices has been satisfactory for its specific purpose. However a wide variety of reels and hubs are used in the industry, and similar products from various manufacturers have different characteristics.

Accordingly it is an object of the present invention to provide a new and improved locking mechanism which works with a variety of different manufacturers' products, and which can be utilized for manually locking and/or centrifugal locking. A further object is to provide such a locking mechanism which is suitable for use with both low and high speed tape drives and which will provide centering of reels and hubs, particularly in high speed operation.

It is an additional object of the invention to provide such a locking mechanism which can be actuated with one hand and which provides a positive push latch for locking.

Other objects, advantages, features and results will more fully appear in the course of the following description.

SUMMARY OF THE INVENTION

A reel and hub locking mechanism for a tape drive with a subplate and a ball housing adapted for mounting on a drive shaft with the ball housing positioned over the subplate. The housing incorporates a plurality of radial passages each having a converging taper in the outward direction thereby permitting radial movement of a ball in the passage while retaining the ball. A plunger is mounted in the housing for axial sliding between locking and non-locking positions, with the plunger having flexible fingers which engage and urge the balls outward when the plunger is moved to the locking position. The engagement of the plunger fingers and balls latches the plunger in the locking position, but the fingers are flexible, permitting manual unlatching. The tape reel or hub is positioned over the housing at the subplate, with outward movement of the balls locking the reel or hub between the balls and subplate, and with the centrifugal force on the balls during operation centering the reel or hub about the drive shaft.

BRIEF DESCRIPTION OF THE DRAWINGS

FIG. 2 is a vertical sectional view through the locking mechanism of FIG. 1, shown in the non-locking position; and FIG. 3 is a view similar to that of FIG. 2, shown in the locking position.

DESCRIPTION OF THE PREFERRED EMBODIMENT

Figure 1:
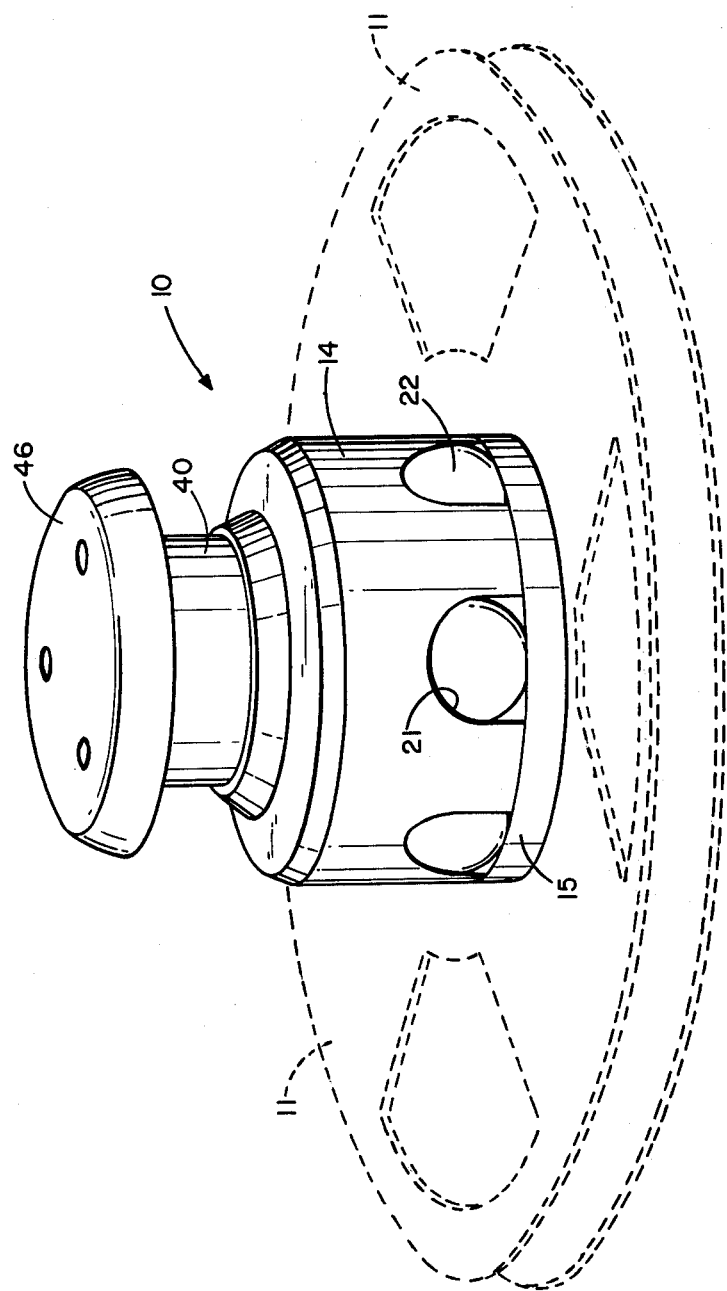
FIG. 1 is a perspective view of a locking mechanism with a tape reel shown in phantom lines, and incorporating the presently preferred embodiment of the invention.

In the drawings, the locking mechanism 10 is shown used with a reel 11. However the mechanism is equally suitable for use with hubs used in forming tape pancakes. A reel has a center sleeve with spaced flanges, while a hub has only the center sleeve. The locking mechanism includes a housing 13 formed with a top plate 14 and a bottom plate 15 joined together by screws 16. The top plate 14 engages the bottom plate 15 at the surfaces 16, 17.

A plurality of generally radial passages 20 is provided in the housing 13. The passages 20 taper and converge in a radially outward direction with a peripheral opening 21. In the embodiment illustrated, six such passages are utilized. A spherical ball 22 is positioned in each of the passages, with the diameter of the ball such that the ball will not pass through the opening 21.

The housing 13 is positioned above a subplate 24 on a drive shaft 25. A collet 30 with a frusto-conical outer surface 31 is clamped on the drive shaft 25 by a nut 32 which urges a mating frusto conical surface of the bottom plate 15 downward on the collet. The lower end of the collet is divided into axial segments by slots 33, typically three such slots and segments. The upper end of the collet is externally threaded for mating with the internal threads of a clamp nut 32.

The subplate 24 is attached to the drive shaft 25 by conventional means, the collet 30 is positioned on the shaft resting on the subplate 24, the housing 13 is placed on the collet, and the nut is tightened on the collet to complete the mounting.

A plunger 40 is slidably positioned in an opening 41 in the top plate 14 of the housing 13. A central passage 42 in the plunger provides access to the nut 32 for mounting and dismounting of the housing. The lower end of the plunger 40 is divided into a plurality of fingers 43, by slots 44. Preferably a finger 43 is provided for each of the balls 22. A spring 45 is positioned within the plunger 40 and is held in place by a handle 46 attached to the plunger 40 by screws 47. The spring 45 urges the plunger toward the upward or non-locking position of FIG. 2, with upward movement of the plunger limited by engagement of finger shoulders 50 with surface 51 of the top plate of the housing.

The position as shown in FIG. 2 is the manual non-locking position. With the mechanism in the position of FIG. 2, the reel or hub may be positioned over the housing, resting on the subplate. This configuration provides for centrifugal centering and locking of the reel or hub on the drive. As the drive shaft 25 comes up to speed, centrifugal force moves the balls 22 outward in the passages 20, with the balls engaging the reel and the upper surfaces of the passages, thereby locking the reel between the balls and the subplate and centering the reel on the housing.

When desired, manual locking may also be obtained by moving the plunger downward from the non-locking position of FIG. 2 to the locking position of FIG. 3. The fingers 43 of the plunger 40 are flexible so that the fingers can bend inwardly moving over the balls 22 to position the shoulders 50 at the balls. Preferably the shoulders have concave surfaces 53 shaped to engage the balls 22. The fingers force the balls outward to the locking position, with ball movement limited by the reel and the housing.

With this configuration, the engagement of the balls with the concave surfaces of the fingers latches the plunger in the locking position of FIG. 3. The mechanism is readily unlocked by manually pulling upward on the handle 46, with the fingers 43 bending inwardly so that the shoulders of the fingers pass the balls. In the preferred embodiment, the spring 45 is utilized to maintain the plunger in the upward or non-locking position so that the plunger does not rest on the balls, but rather clears the balls as seen in FIG. 2.

The locking mechanism of the present invention provides for locking by centrifugal force without requiring movement of the plunger and, alternatively, provides for mechanical locking by manually moving the plunger downward. The mechanical locking and unlocking is readily obtained with one-hand operation, thereby easing the loading and unloading of reels and hubs.

I claim:

1. In a reel and hub locking mechanism for a tape drive, the combination of:
   a subplate;
   a ball housing positioned over said subplate and having a plurality of radial passages, with each of said passages having a converging taper in the outward direction;
   a ball positioned in each of said passages for radial movement, with the peripheral opening of the passage of a size smaller than the ball to retain the ball in the passage;
   means for mounting said subplate and ball housing on a drive shaft; and
   a plunger mounted in said housing for axial sliding between locking and non-locking positions,
   said plunger having a plurality of flexible fingers having an overall dimension (a) to engage and force said balls outward in said passages when said plunger is moved to said locking position, with said fingers individually flexing inwardly to apply outward forces on said balls thereby centering and locking a reel or hub between said balls and subplate, and
   (b) to be spaced from said balls when said plunger is moved to said non-locking position a distance permitting said balls to move inward in said passages to clear a reel or hub, with said balls moving radially freely in said passages so that rotation of said mechanisms produces forces moving said balls radially outward thereby centering and locking a reel or hub between said balls and subplate.

2. A locking mechanism as defined in claim 1 wherein each of said fingers has a first outwardly projecting, ball engaging, concave shoulder, with engagement of said balls in said concave shoulders latching said plunger in said locking position.

3. A locking mechanism as defined in claim 2 wherein said plunger shoulders are disposed within and engageable with said housing, and including a spring positioned within said housing urging said plunger toward non-locking position.

4. A locking mechanism as defined in claim 1 wherein said mounting means includes:
   a collet having one end axially divided into a plurality of segments having an inner axial opening for the drive shaft, and an outer frusto-conical surface,
   with said housing having a mating frusto-conical surface; and
   clamp means engageable with said collet and housing for axially drawing said collet into said housing and clamping said collet segments onto the drive shaft.

* * * * *